United States Patent
Kondrk

(10) Patent No.: US 11,686,520 B2
(45) Date of Patent: Jun. 27, 2023

(54) SYSTEM FOR TRANSPORT REFRIGERATION CONTROL OF MULTIPLE COMPARTMENTS

(71) Applicant: Carrier Corporation, Farmington, CT (US)

(72) Inventor: Jason R. Kondrk, Clay, NY (US)

(73) Assignee: Carrier Corporation, Palm Beach Gardens, FL (US)

( * ) Notice: Subject to any disclaimer, the term of this patent is extended or adjusted under 35 U.S.C. 154(b) by 233 days.

(21) Appl. No.: 16/760,761

(22) PCT Filed: Oct. 30, 2018

(86) PCT No.: PCT/US2018/058123
§ 371 (c)(1),
(2) Date: Apr. 30, 2020

(87) PCT Pub. No.: WO2019/089526
PCT Pub. Date: May 9, 2019

(65) Prior Publication Data
US 2020/0256609 A1    Aug. 13, 2020

Related U.S. Application Data

(60) Provisional application No. 62/579,397, filed on Oct. 31, 2017.

(51) Int. Cl.
*F25B 27/00* (2006.01)
*F25D 11/02* (2006.01)
(Continued)

(52) U.S. Cl.
CPC ......... *F25D 11/025* (2013.01); *B60H 1/3222* (2013.01); *F25B 27/00* (2013.01);
(Continued)

(58) Field of Classification Search
CPC .... F25B 27/00; F25B 49/005; F25B 2327/00; F25B 2400/06; F25B 2600/02;
(Continued)

(56) References Cited

U.S. PATENT DOCUMENTS 4,084,388 A * 4/1978 Nelson .................. G05D 23/24
                                                        62/196.2
4,829,777 A * 5/1989 Matsuoka ............. F25B 49/005
                                                        62/149
(Continued)

FOREIGN PATENT DOCUMENTS

CN     101685894 A     3/2010
CN     106457973 A     2/2017
(Continued)

OTHER PUBLICATIONS

International Search Report and Written Opinion for International Application No. PCT/US2018/058123 dated Jan. 14, 2019.

*Primary Examiner* — Jerry-Daryl Fletcher
*Assistant Examiner* — Daniel C Comings
(74) *Attorney, Agent, or Firm* — Carlson, Gaskey & Olds, P.C.

(57) ABSTRACT

An example transport refrigeration system includes first and second refrigeration circuits configured to cool first and second transport compartments, respectively. An electric machine powers the first and second refrigeration circuits. A controller is configured to monitor a temperature of the electric machine, and reduce a cooling capacity of a selected one of the first and second refrigeration circuits based on the temperature exceeding a first threshold.

22 Claims, 4 Drawing Sheets

(51) Int. Cl.
*F25B 49/00* (2006.01)
*F25D 19/00* (2006.01)
*F25D 21/00* (2006.01)
*B60H 1/32* (2006.01)

(52) U.S. Cl.
CPC .......... *F25B 49/005* (2013.01); *F25D 19/003* (2013.01); *F25D 21/006* (2013.01); *F25B 2327/00* (2013.01); *F25B 2400/06* (2013.01); *F25B 2600/0251* (2013.01); *F25D 2600/06* (2013.01); *F25D 2700/121* (2013.01)

(58) Field of Classification Search
CPC ............. F25B 2600/025; F25B 11/025; F25B 19/003; F25B 21/006; F25B 2600/06; F25B 2700/121; B60H 1/3204; B60H 1/3205; B60H 1/321; B60H 1/3222; B60H 1/3228; B60H 1/3232; B60H 2001/3255; B60H 2001/3257; B60H 2001/3267; F25D 11/025; F25D 19/003; F25D 21/006; F25D 2600/06; F25D 2700/121
See application file for complete search history.

(56) References Cited

U.S. PATENT DOCUMENTS

| | | | | |
|---|---|---|---|---|
| 5,054,294 | A | * | 10/1991 | Dudley ................ F25B 49/022 62/228.4 |
| 5,201,186 | A | * | 4/1993 | Hanson ................ B60H 1/3225 123/198 D |
| 2005/0097908 | A1 | * | 5/2005 | Lifson .................. F04C 29/042 62/196.4 |
| 2009/0205354 | A1 | * | 8/2009 | Brown .................. F25B 47/025 62/324.5 |
| 2015/0291008 | A1 | * | 10/2015 | Seto .................... B60H 1/00385 62/208 |

FOREIGN PATENT DOCUMENTS

| | | |
|---|---|---|
| DE | 102014016939 A1 | 5/2016 |
| EP | 1039252 A2 | 9/2000 |
| EP | 2202471 A1 | 6/2010 |
| WO | 2017078942 A1 | 5/2017 |

\* cited by examiner

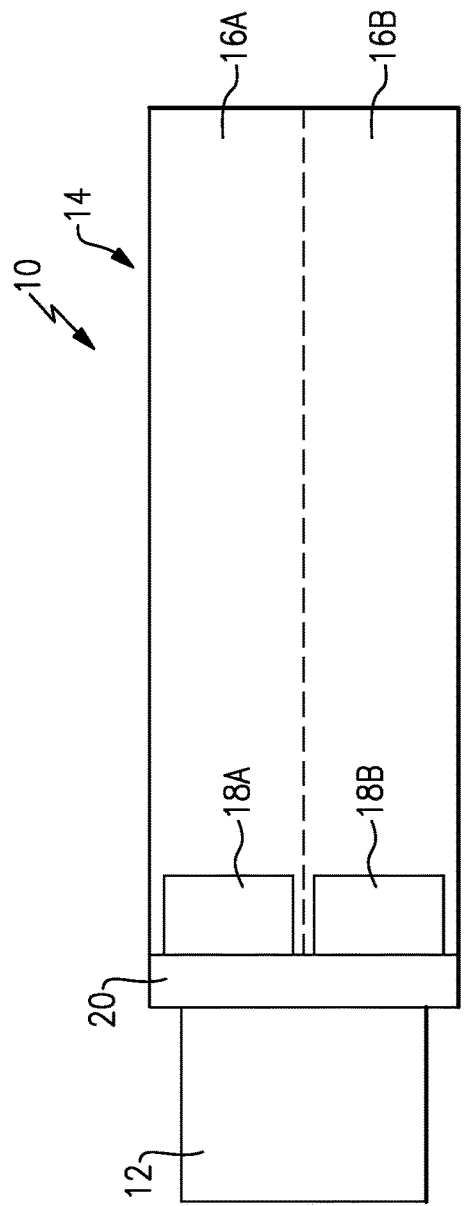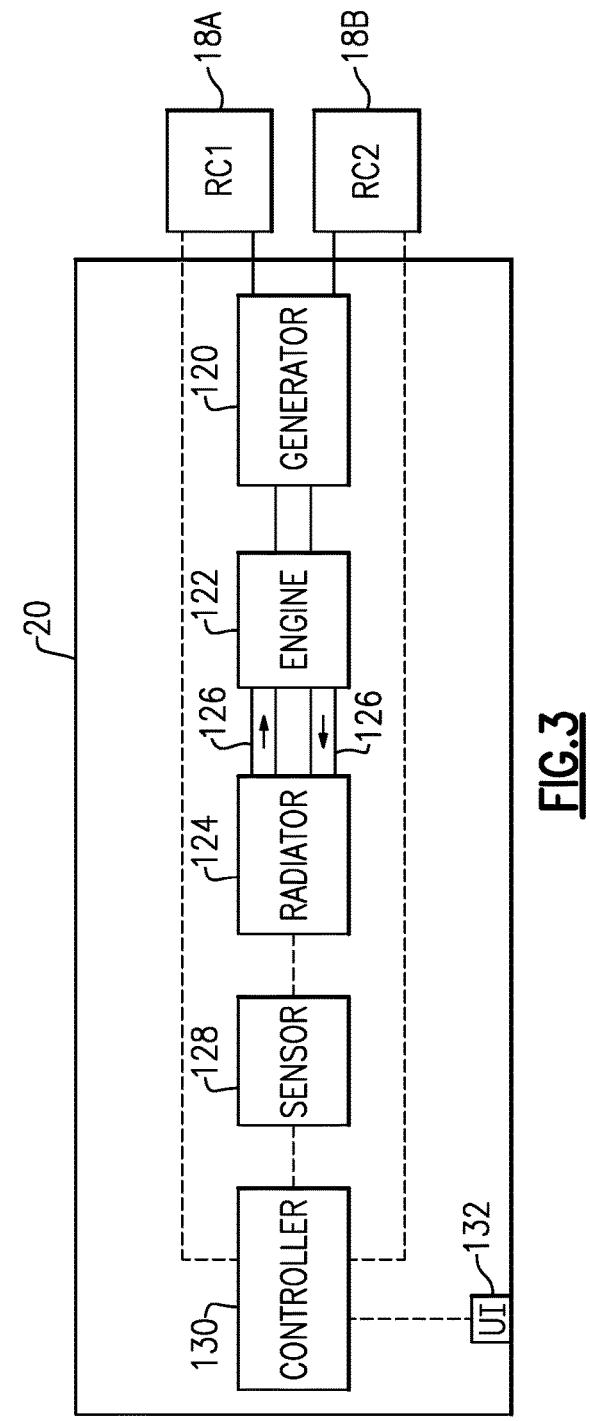

SYSTEM FOR TRANSPORT REFRIGERATION CONTROL OF MULTIPLE COMPARTMENTS

CROSS-REFERENCE TO RELATED APPLICATIONS

This is a national stage application, filed under 35 U.S.C. § 371, of International Patent Application No. PCT/US2018/058123, filed Oct. 30, 2018, which claims the benefit of U.S. Provisional Application No. 62/579,397, filed Oct. 31, 2017, each of which is incorporated by reference herein in its entirety.

BACKGROUND

The present disclosure relates to refrigeration, and more particularly to control of a multi-compartment transport refrigeration system.

Refrigerated vehicles for cooling and transporting cargo, such as food, are known. The refrigeration circuits for providing such cooling may be incorporated into the vehicle, or into a removable trailer unit. Some refrigerated vehicles include two transport compartments that are cooled by separate refrigeration circuits. The power required by the refrigeration circuits is greater during an initialization period when the refrigeration circuits are turned from an OFF state to an ON state, and are commanded to cool from an initial ambient temperature to respective setpoint temperatures.

SUMMARY

One example embodiment of a transport refrigeration system includes first and second refrigeration circuits configured to cool first and second transport compartments, respectively; an electric machine that powers the first and second refrigeration circuits; and a controller configured to monitor a temperature of the electric machine, and reduce a cooling capacity of a selected one of the first and second refrigeration circuits based on the temperature exceeding a first threshold.

In another example embodiment of the above described transport refrigeration system, the controller is configured to, in a first control mode: determine a difference between a respective current temperature and a respective setpoint temperature of each of the transport compartments, and select the refrigeration circuit whose associated compartment has the greatest difference as the selected refrigeration circuit.

In another example embodiment of any of the above described transport refrigeration systems, the first and second refrigeration circuits are in a cooling mode in the first control mode.

In another example embodiment of any of the above described transport refrigeration systems, the controller is configured to, in a second control mode in which one of the refrigeration circuits is in a defrost mode, select whichever of the refrigeration circuits is not in the defrost mode as the selected refrigeration circuit.

In another example embodiment of any of the above described transport refrigeration systems, the controller is configured to shut down the selected refrigeration circuit if the temperature exceeds a second threshold that is higher than the first threshold.

In another example embodiment of any of the above described transport refrigeration systems, to reduce the cooling capacity of the selected one of the first and second refrigeration circuits, the controller is configured to reduce a power consumption of a compressor of the selected refrigeration circuit.

In another example embodiment of any of the above described transport refrigeration systems, to reduce the cooling capacity of the selected one of the first and second refrigeration circuits, the controller is configured to cause the refrigeration circuit to maintain a current internal temperature of its associated transport compartment that is different than a setpoint temperature of the associated transport compartment.

In another example embodiment of any of the above described transport refrigeration systems, the controller is configured to maintain a full cooling capacity of the non-selected one of the first and second refrigeration circuits while the cooling capacity of the selected one of the first and second refrigeration circuits is reduced.

In another example embodiment of any of the above described transport refrigeration systems, the controller is configured to increase the reduced cooling capacity of the selected one of the first and second refrigeration circuits based on the temperature falling below a second threshold that is lower than the first threshold.

In another example embodiment of any of the above described transport refrigeration systems, the electric machine includes an engine and a generator that is separate from the engine, and the temperature of the electric machine is a temperature of the engine.

In another example embodiment of any of the above described transport refrigeration systems, the electric machine includes an engine-generator.

One example embodiment of a method of controlling a transport refrigeration system includes powering first and second refrigeration circuits from an electric machine, wherein the first and second refrigeration circuits cool respective transport compartments, monitoring a temperature of the electric machine, and reducing a cooling capacity of a selected one of the first and second refrigeration circuits based on the temperature exceeding a first threshold.

In another example embodiment of the above described method, the method includes, in a first control mode, determining a difference between a respective current temperature and a respective setpoint temperature of each of the transport compartments, and selecting the refrigeration circuit whose associated compartment has the greatest difference as the selected refrigeration circuit.

In another example embodiment of any of the above described methods, the first and second refrigeration circuits are in a cooling mode in the first control mode.

In another example embodiment of any of the above described methods, the method includes, in a second control mode in which one of the refrigeration circuits is in a defrost mode, selecting whichever refrigeration circuit is not in the defrost mode as the selected refrigeration circuit.

In another example embodiment of any of the above described methods, the method includes shutting down a selected one of the refrigeration circuits if the temperature exceeds a second threshold that is higher than the first threshold.

In another example embodiment of any of the above described methods, reducing a cooling capacity of a selected one of the first and second refrigeration circuits includes reducing a power consumption of a compressor of the selected refrigeration circuit.

In another example embodiment of any of the above described methods, reducing a cooling capacity of a selected one of the first and second refrigeration circuits includes causing the refrigeration circuit to maintain a current internal temperature of its associated transport compartment that is different than a setpoint temperature of the associated transport compartment.

In another example embodiment of any of the above described methods, the method includes maintaining a full cooling capacity of the non-selected one of the first and second refrigeration circuits while the cooling capacity of the selected one of the first and second refrigeration circuits is reduced.

In another example embodiment of any of the above described methods, the method includes increasing the reduced cooling capacity of the selected one of the first and second refrigeration circuits based on the temperature falling below a second threshold that is lower than the first threshold.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIG. 1 schematically illustrates a transport refrigeration system.

FIG. 3 schematically illustrates a power and control section of a transport refrigeration system.

DETAILED DESCRIPTION

FIG. 1 schematically illustrates an example transport refrigeration system 10 that includes a vehicle portion 12 and a storage portion 14. The storage portion 14 could be integrated with the vehicle portion 12 (e.g., a refrigerated truck), or could be readily removable from the vehicle portion (e.g., a refrigerated trailer).

The storage portion 14 includes a first transport compartment 16A and a second transport compartment 16B for holding and cooling cargo. In some examples, the cargo of the different compartments may have different temperature requirements.

A first refrigeration circuit 18A is configured to cool the first transport compartment 16A, and a second refrigeration circuit 18B is configured to cool the second transport compartment 16B. A power and control section 20 is operable to power and control the refrigeration circuits 18A-B.

Figure 2:
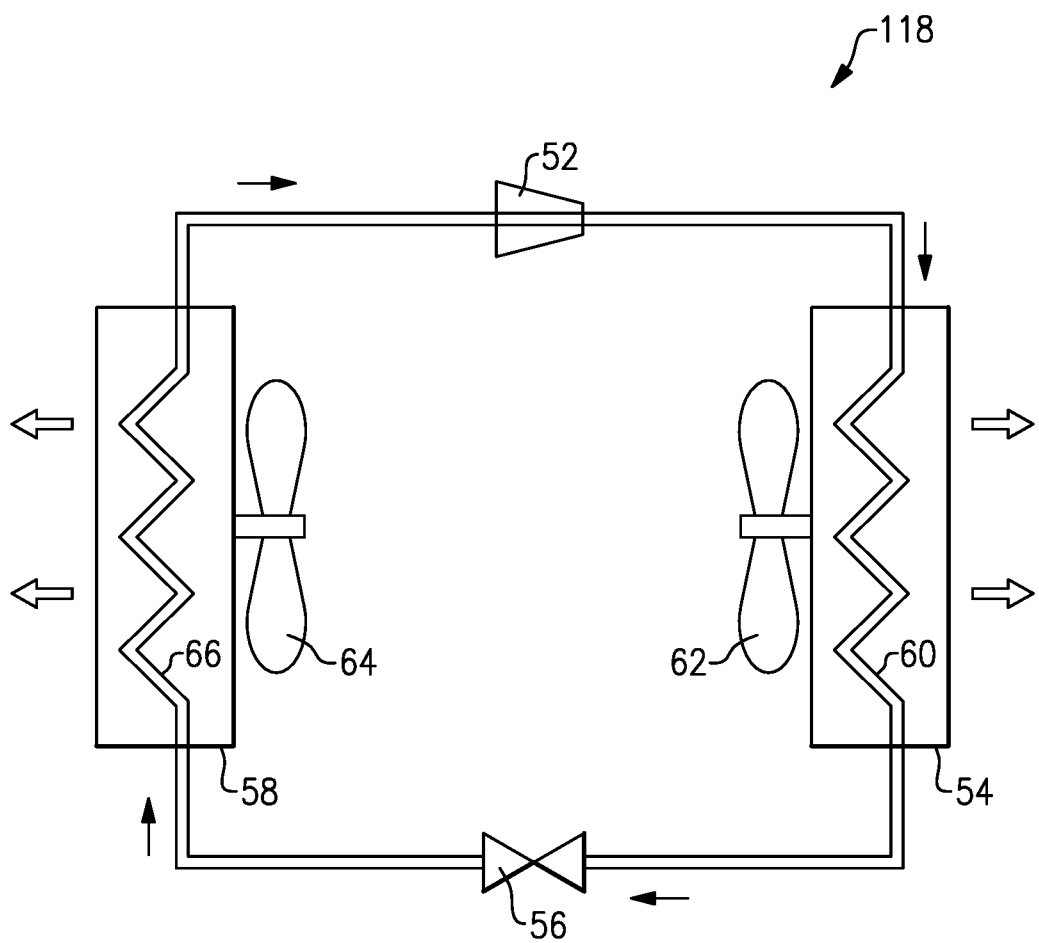
FIG. 2 schematically illustrates an example refrigeration circuit.

FIG. 2 schematically illustrates an example refrigeration circuit 18 that could be used in the transport refrigeration system 10. In particular, the example refrigeration circuit 18 is representative of the components associated with each of the first and second refrigeration circuits 18A, 18B. In one embodiment, the example refrigeration circuit includes a compressor 52, a first heat exchanger 54, an expansion device 56, and a second heat exchanger 58. Refrigerant is compressed in the compressor 52, and exits the compressor 52 at a high pressure and a high enthalpy, and flows to the first heat exchanger 54.

The first heat exchanger 54 operates as a condenser. In the first heat exchanger 54, refrigerant flows through a coil 60 and rejects heat to air that is drawn over the coil 60 by a blower fan 62. In the first heat exchanger 54, refrigerant is condensed into a liquid that exits the first heat exchanger 54 at a low enthalpy and a high pressure.

The refrigerant flows from the first heat exchanger 54 to an expansion device 56, such as an expansion valve, that expands the refrigerant to a low pressure. After expansion, the refrigerant flows through the second heat exchanger 58, which operates as an evaporator. A blower fan 64 draws air through the second heat exchanger 58 and over a coil 66. The refrigerant flowing through the coil 66 accepts heat from air, exiting the second heat exchanger 58 at a high enthalpy and a low pressure. The refrigerant then flows to the compressor 52, completing its refrigeration cycle.

FIG. 3 schematically illustrates an example power and control section 20 for the transport refrigeration system 10. A generator 120 powers the first and second refrigeration circuits 18A-B. In one example, the generator 120 powers the compressor 52, fan 62, and fan 64 of each refrigeration circuit 18.

An engine 122 drives operation of the generator 120. Collectively, the engine 122 and generator 120 provide an electric machine which converts mechanical energy into electrical energy. In one example, the generator 120 is separate from the engine 122, and the engine 122 acts as a prime mover for the generator 120. In another example, the generator 120 and engine 122 are part of a single device (e.g., an engine-generator), and the generator 120 may include an alternator component. Thus, although the generator 120 and engine 122 are depicted as separate components in FIG. 3, it should be understood that they could be part of a single engine-generator device. Further, it should be understood that reference to an "electric machine" in this disclosure may refer to the generator 120, engine 122, or both.

In one example, the engine 122 is a diesel internal combustion engine. A radiator 124 cools the engine 122 by providing a flow of coolant through channels 126 that are in fluid communication with the engine 122.

A sensor 128 is operable to detect a temperature (TENG) of the engine 122. In one example, the sensor 128 detects a temperature of coolant leaving the engine 122. In another example, the sensor directly measures the temperature of engine 122 without measuring the coolant temperature.

A controller 130 controls operation of the first and second refrigeration circuits 18A-B based on the respective internal temperatures of the transport compartments 16A-B, a setpoint temperature of each transport compartment 16, and the engine temperature TENG.

A setpoint is a target temperature that corresponds to a desired temperature for its associated transport compartment 16. In some examples, the different transport compartments 16 may have different setpoint temperatures, depending on what goods are being transported in the transport compartments 16.

The setpoint temperature may be set through a user interface 132, for example, which may include an electronic display and one or more input devices for interacting with the controller 130 (e.g. a touchscreen, dial, or buttons).

The cooling demand of the refrigeration circuits 18A-B may contribute to high engine 122 and generator 120 loading in order to satisfy the demand This increase in power demand may contribute to an elevated engine coolant temperature TENG that must be maintained within the proper operating window. Other factors that could contribute to increased engine 122 operating temperatures include an increased ambient temperature outside the transport refrigeration system 10, a malfunction of the radiator 124 (e.g., a fan failure, coolant leak, reduced airflow), or a combination of these factors.

In the event of an elevated engine temperature, the controller 130 is operable to reduce the cooling capacity of one of the refrigeration circuits 18A-B to maintain the engine temperature TENG within an acceptable temperature range. In particular, the controller 130 is operable to reduce the cooling capacity of one of the refrigeration circuits 18A-B by providing corresponding instructions in order to reduce power consumption to one or more of the components of the refrigeration circuits 18A-B, such as those discussed above relative to FIG. 2. For example, the controller 130 could send instructions to reduce the mass flow of refrigerant to the compressor 52 or select a compressor 52 unloading operation. These are non-limiting examples, and other actions could be taken as well or instead to reduce refrigerant circuit 18 power consumption.

The discussion below includes three temperature threshold levels. A first threshold L1 is a full operation threshold below which both refrigeration circuits 18 may be operated at their full cooling capacity. A second threshold L2 is a warning threshold, above which a cooling capacity of one of the refrigeration circuits 18 will be reduced (e.g., to a "null" mode). A third threshold L3 is a shut down threshold, above which one of the refrigeration circuits 18 will be turned off.

Figure 4:
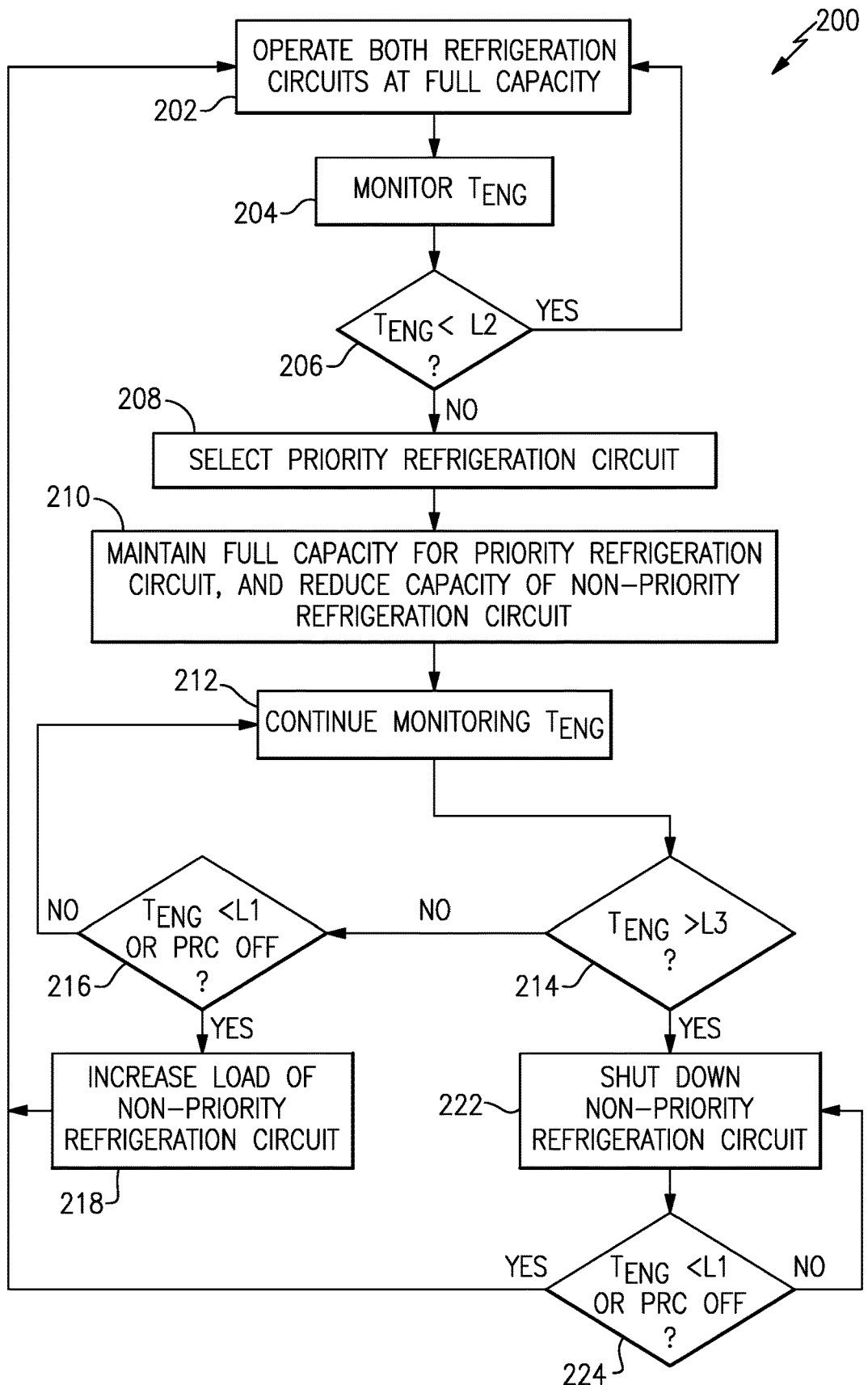
FIG. 4 is flow chart representative of an example method of controlling a transport refrigeration system.

FIG. 4 is a flowchart representative of an example method 200 of controlling the transport refrigeration system 10 using the thresholds L1, L2, L3. Initially, both of the refrigeration circuits 18 are operated at their full cooling capacity, based on their respective setpoints (block 202). In one example, neither of the refrigeration circuits 18A-B has achieved its setpoint temperature when the method 200 is performed (e.g., both refrigeration circuits 18A-B have recently been turned ON).

As the transport compartments 16A-B are being cooled, the controller 130 monitors the temperature TENG of the engine 122 (block 204). If the engine temperature TENG remains below the warning threshold L2, the controller 130 continues to operate the refrigeration circuits 18 at their full cooling capacity (a "yes" to block 206). However, if the engine temperature exceeds the warning threshold L2, the controller 130 selects one of the refrigeration circuits as a priority refrigeration circuit (block 208).

The selection of step 208 in some examples includes determining an operation mode of the refrigeration circuits 18A-B. In one example, in which both of the refrigeration circuits 18 are in a cooling mode, the controller 130 determines a difference between a respective current temperature and a respective setpoint temperature of each of the transport compartments 16A-B (a "control error"), selects the refrigeration circuit 18 whose associated transport compartment 16 has the greatest control error as the non-priority system, and selects the system having the lowest control error as the priority system.

In another example, one of the refrigeration circuits 18 is in a cooling mode and another of the refrigeration circuits 18 is in a defrost mode in which an electric heater is being operated to melt frost on a component of the refrigeration circuit. In this example, the controller 130 selects the refrigeration circuit 18 that is in the defrost mode as the priority refrigeration circuit 18, and selects the refrigeration circuit 18 that is in the cooling mode as the non-priority refrigeration circuit 18. This allows the refrigeration circuit 18 in the defrost mode to adequately power a frost-reducing heating element (not shown).

Having determined the priority refrigeration circuit in step 208, the controller 130 maintains normal operation of the priority refrigeration circuit, and reduces the cooling capacity of the non-priority refrigeration circuit (block 210). In this context, "load" refers to compressor loading based on cooling capacity demand, not cargo load. The unloading reduces an electrical load of the non-priority refrigeration circuit, and correspondingly reduces the cooling capacity of the non-priority refrigeration circuit. This allows the engine 122 electrical demand to be reduced, and further allows for the engine temperature TENG to decrease away from the threshold L2.

In one example, the unloaded refrigeration circuit 18 may maintain its current temperature depending on its transported cargo type and environmental heat transfer between the storage portion 14 and an outside ambient environment, even though the current temperature is greater than its setpoint temperature. In another example, the unloaded refrigeration circuit 18 still tries to reach its setpoint temperature while unloaded but does so more slowly than it would if fully loaded.

The controller 130 continues to monitor the engine temperature TENG (block 212). If the engine temperature TENG does not exceed L3 (a "no" to block 214), the controller 130 determines if the engine temperature has fallen below the full operation threshold L1 (block 216). If the temperature has dropped below L1 or if the priority refrigeration circuit 18 has been shut OFF, the controller 130 increases the load of the non-priority refrigeration circuit (block 218). Otherwise, if the temperature remains between L1 and L3 and the priority refrigeration circuit 18 remains ON (a "no" to both block 214 and 216), the controller 130 continues to monitor the engine temperature TENG (block 212).

If the engine temperature does exceed L3 (a "yes" to block 214), the controller 130 shuts down the non-priority refrigeration circuit 18 (block 222). Thus, the non-priority refrigeration circuit 18 can be shut down if entering a reduced cooling capacity operating mode is not enough to prevent the engine temperature from exceeding the threshold L3. The shut down refrigeration circuit 18 can be reactivated again in response to a trigger condition (block 224), such as the priority refrigeration circuit 18 being turned OFF, or the engine temperature TENG reaching a temperature below the threshold L1. Another example trigger condition, not shown in FIG. 4, could include the priority refrigeration circuit 18 reaching its setpoint.

In one example, when increasing the reduced load of the non-priority refrigeration circuit in step 218, the controller 130 increases the load immediately back to its initial level (e.g., full cooling capacity). In another example, when increasing the reduced load of the non-priority refrigeration circuit in step 218, the controller 130 gradually increases the load back to its initial level, with continued monitoring of the engine temperature TENG along the way.

When both refrigeration circuits 18 are in a cooling mode, selecting the refrigeration circuit having the lowest control error as the priority refrigeration circuit increases a likelihood that the priority refrigeration circuit will be able to reach its setpoint temperature, at which point the load of the priority refrigeration circuit will likely lower on its own, and at which time a load of the non-priority refrigeration circuit can potentially be increased.

In some instances, if the refrigeration circuit 18 having the largest control error was instead selected as the priority refrigeration system, it is possible that neither refrigeration circuit 18 would be able to achieve its setpoint.

Figure 5:
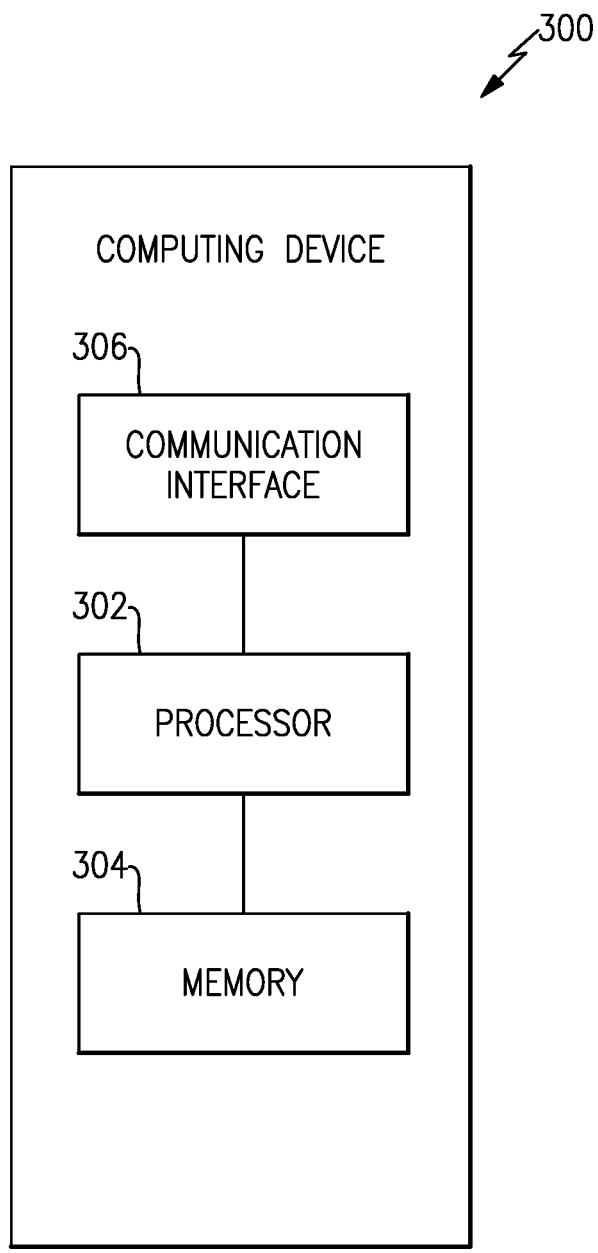
FIG. 5 schematically illustrates an example controller for a transport refrigeration system.

FIG. 5 schematically illustrates an example computing device 300 that may be used as the controller 130 in FIG. 3. The computing device 300 includes a processor 302 that is operatively connected to memory 304 and to a communication interface 306.

The processor 302 includes processing circuitry to perform the method 200. The processor 302 may include one or more microprocessors, microcontrollers, application specific integrated circuits (ASICs), or the like, for example.

The memory 304 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 304 may incorporate electronic, magnetic, optical, and/or other types of storage media. The memory 304 can also have a distributed architecture, where various components are situated remotely from one another, but can be accessed by the processor 302. In some examples, the memory stores a setpoint temperature for each of the transport compartments 16A-B based on input received from the user interface 132.

The communication interface 306 is configured to facilitate communication with other items in the transport refrigeration system 10, such as the user interface 132, sensor 128, and the refrigeration circuits 18A-B, using a wired and/or wireless communication.

The techniques discussed herein minimize the risk that both refrigeration circuits 18 will need to be shut down, and therefore reduces the risk of cargo loss/spoilage.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A transport refrigeration system, comprising:
   first and second refrigeration circuits configured to cool first and second transport compartments, respectively;
   an electric machine that powers the first and second refrigeration circuits; and
   a controller configured to:
     monitor a temperature of the electric machine;
     reduce a cooling capacity of a selected one of the first and second refrigeration circuits based on the temperature exceeding a first threshold; and
     in a first control mode:
       determine a difference between a respective current temperature and a respective setpoint temperature of each of the transport compartments; and
       select the refrigeration circuit whose associated transport compartment has the greatest difference as the selected refrigeration circuit.

2. The transport refrigeration system of claim 1, wherein the first and second refrigeration circuits are in a cooling mode in the first control mode.

3. The transport refrigeration system of claim 1, wherein the controller is configured to, in a second control mode in which one of the refrigeration circuits is in a defrost mode:
   select whichever of the refrigeration circuits is not in the defrost mode as the selected refrigeration circuit;
   wherein the first control mode is different from the second control mode.

4. The transport refrigeration system of claim 3, wherein:
   said one of the refrigeration circuits that is in the defrost mode includes an electric heater; and
   the electric machine powers the electric heater during the defrost mode of said one of the refrigeration circuits that is in the defrost mode.

5. The transport refrigeration system of claim 1, wherein the controller is configured to shut down the selected refrigeration circuit if the temperature exceeds a second threshold that is higher than the first threshold.

6. The transport refrigeration system of claim 1, wherein to reduce the cooling capacity of the selected one of the first and second refrigeration circuits, the controller is configured to:
   reduce a power consumption of a compressor of the selected refrigeration circuit.

7. The transport refrigeration system of claim 1, wherein to reduce the cooling capacity of the selected one of the first and second refrigeration circuits, the controller is configured to:
   cause the selected one of the first and second refrigeration circuits to maintain a current internal temperature of its associated transport compartment that is different than a setpoint temperature of the associated transport compartment.

8. The transport refrigeration system of claim 1, wherein the controller is configured to:
   maintain a full cooling capacity of the non-selected one of the first and second refrigeration circuits while the cooling capacity of the selected one of the first and second refrigeration circuits is reduced.

9. The transport refrigeration system of claim 1, wherein the controller is configured to:
   increase the reduced cooling capacity of the selected one of the first and second refrigeration circuits based on the temperature falling below a second threshold that is lower than the first threshold.

10. The transport refrigeration system of claim 1, wherein the electric machine comprises an engine and a generator that is separate from the engine, and the temperature of the electric machine is a temperature of the engine.

11. The transport refrigeration system of claim 1, wherein the electric machine comprises an engine-generator.

12. The transport refrigeration system of claim 1, wherein to reduce a cooling capacity of said selected one of the first and second refrigeration circuits, the controller is configured to reduce a mass flow of refrigerant to a compressor of said selected one of the first and second refrigeration circuits.

13. A method of controlling a transport refrigeration system, comprising:
   powering first and second refrigeration circuits from an electric machine, wherein the first and second refrigeration circuits cool respective transport compartments;
   monitoring a temperature of the electric machine;
   reducing a cooling capacity of a selected one of the first and second refrigeration circuits based on the temperature exceeding a first threshold; and
   in a first control mode:
     determining a difference between a respective current temperature and a respective setpoint temperature of each of the transport compartments; and
     selecting the refrigeration circuit whose associated compartment has the greatest difference as the selected refrigeration circuit.

14. The method of claim 13, wherein the first and second refrigeration circuits are in a cooling mode in the first control mode.

15. The method of claim 13, comprising, in a second control mode in which one of the refrigeration circuits is in a defrost mode:
- selecting whichever refrigeration circuit is not in the defrost mode as the selected refrigeration circuit;
- wherein the first control mode is different from the second control mode.

16. The method of claim 15, comprising, during the defrost mode:
- operating an electric heater of said one of the refrigeration circuits that is in the defrost mode.

17. The method of claim 13, comprising:
- shutting down a selected one of the refrigeration circuits if the temperature exceeds a second threshold that is higher than the first threshold.

18. The method of claim 13, wherein said reducing a cooling capacity of a selected one of the first and second refrigeration circuits comprises:
- reducing a power consumption of a compressor of the selected refrigeration circuit.

19. The method of claim 13, wherein said reducing a cooling capacity of a selected one of the first and second refrigeration circuits comprises:
- causing the selected one of the refrigeration circuits to maintain a current internal temperature of its associated transport compartment that is different than a setpoint temperature of the associated transport compartment.

20. The method of claim 13, comprising:

maintaining a full cooling capacity of the non-selected one of the first and second refrigeration circuits while the cooling capacity of the selected one of the first and second refrigeration circuits is reduced.

21. The method of claim 13, comprising:

increasing the reduced cooling capacity of the selected one of the first and second refrigeration circuits based on the temperature falling below a second threshold that is lower than the first threshold.

22. The method of claim 13, wherein said reducing a cooling capacity of the selected one of the first and second refrigeration circuits comprises reducing a mass flow of refrigerant to a compressor of said selected one of the first and second refrigeration circuits.

* * * * *